United States Patent
Heydinger

(10) Patent No.: US 7,452,047 B2
(45) Date of Patent: Nov. 18, 2008

(54) METHOD OF PRINTING USING ERROR DIFFUSED SHINGLING MASKS

(75) Inventor: Scott Michael Heydinger, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 7 days.

(21) Appl. No.: 11/425,730

(22) Filed: Jun. 22, 2006

(65) Prior Publication Data
US 2007/0296750 A1    Dec. 27, 2007

(51) Int. Cl.
*B41J 2/205* (2006.01)
(52) U.S. Cl. .............................. 347/15; 347/41; 358/3.03
(58) Field of Classification Search .................. 347/15, 347/43, 41; 358/1.2, 1.9, 3.03, 3.05
See application file for complete search history.

(56) References Cited

U.S. PATENT DOCUMENTS

| 5,604,520 | A  | * | 2/1997  | Matsubara et al. ............ 347/43 |
| 5,995,715 | A  |   | 11/1999 | Berche et al. |
| 6,082,849 | A  |   | 7/2000  | Chang et al. |
| 6,124,946 | A  |   | 9/2000  | Norton |
| 6,508,535 | B1 |   | 1/2003  | Klassen |
| 6,764,162 | B2 | * | 7/2004  | Biddle et al. ................... 347/37 |
| 6,799,823 | B2 | * | 10/2004 | Miquel et al. .................. 347/15 |

* cited by examiner

*Primary Examiner*—Lamson D Nguyen

(57) ABSTRACT

A method of printing dots in an area on a page using a plurality of printing passes of a printhead over the area, includes processing continuous tone data through a halftoning mechanism to generate halftone image data; and processing the halftone image data through a plurality of error diffused shingling masks, each error diffused shingling mask of the plurality of error diffused masks being used once on a particular pass of the plurality of printing passes in printing the area.

13 Claims, 5 Drawing Sheets

METHOD OF PRINTING USING ERROR DIFFUSED SHINGLING MASKS

FIELD OF THE INVENTION

The present invention relates to printing, and, more particularly, to a method of printing using error diffused shingling masks.

BACKGROUND OF THE INVENTION

Ink jet printing systems produce images by printing patterns of data on a sheet of print media, such as paper. Such systems typically include two main mechanisms for determining the location of dots on the page, namely, a halftone mechanism and a shingling mechanism. Such mechanisms may be implemented, for example, in software, firmware, hardware, or a combination thereof, and may reference one or more lookup tables.

The halftone mechanism compensates for the inability of an ink jet printer, i.e., a binary printer, to print a continuous range of tones. For example, a binary printer can only produce colors by either printing or not printing a dot of ink, which at first glance would suggest only two shades can be printed. However, by printing patterns of various percentages of ink in a given area between zero percent and 100 percent ink, in effect many shades can be produced. Thus, halftoning involves the eventual pattern of dots placed on a page as a result of the printing process and the halftone pattern is visible to the user after the page is completely rendered.

Once the halftone mechanism has decided where the dots of ink are to be placed on the page, the shingling mechanism decides on which pass of plurality of passes of the ink jet printhead over a given prim area that particular dots of ink are to be deposited. Whereas it may be possible to print all of the dots on a single pass over a given area, in general multiple passes are used to hide horizontal bands. It is the function of the shingling mechanism to deposit all of the dots once, and only once, in the positions determined by the halftone algorithm.

In contrast to halftoning, patterns relating to shingling ideally come into play only while the page is printing and are theoretically of no concern once the job is finished as all of the dots have been placed according to the halftone pattern once the job is done. Traditionally there has been more interest in patterns relating to halftoning than in patterns relating to shingling since customers are concerned about the quality of the document after it has been completely printed rather than intermediate states that only exist momentarily as the document is printed.

According to conventional 2-pass shingling, wherein the variable N represents the number of printing passes, on a single pass of the printhead $1/N=\frac{1}{2}=50\%$ of the dots are printed, commonly using a "checkerboard" pattern, which is defined by a shingling mask. The shingling mask determines for given area the pixel locations within that area that may receive a dot of ink in a particular printing pass, and the pixel locations that will not receive a dot of ink on that particular printing pass. Between passes, the paper is moved with respect to the printhead by a distance equal to $1/N=\frac{1}{2}=50\%$ of the height of the printhead. Additionally, between passes of the printhead the shingling pattern is changed from one phase of the checkerboard shingling mask to the complementary phase of the checkerboard shingling mask. By advancing the paper and changing the shingle mask phases, all of the dots at each of the pixel positions in the checkerboard pattern have one and only one chance to be printed.

While shingling at N=2 was used in the example described above, it is also known to perform shingling where the number of passes is greater than 2, e.g., where N=3, 4, 6, 8 and 16. The ideas are the same as for N=2 pass shingling in that a fraction of approximately 1/N of dots requested by the halftone to eventually be deposited is placed on each pass, and the paper is advanced by about 1/N of the fractional height of the printhead. Additionally, the shingling pattern of each level of a shingle mask is extended beyond that of a checkerboard to a different, but typically small, repeating pattern.

Various halftoning algorithms have been implemented that attempt to reduce the generation of undesirable printing artifacts, i.e., the printing of unwanted information, resulting form repetitious halftoning patterns used in attempting to print a desired image. One such halftoning algorithm is known in the art as error diffusion halftoning.

In addition, print artifacts may be present in the multiple shingling mask phases of printing the halftone in multiple passes. For example, print artifacts may be present in the two phases of the exemplary 2-pass checkerboard pattern when the ink dots are not placed mutually exclusively of one another in the checkerboard patter. Instead, the dots overlap with adjacent neighbors between the two passes. The result, for example, is an ordered pattern of white paper showing through what should otherwise be a solid black square.

Several attempts have been made to overcome the problem of the objectionable periodic defects caused by the ordered nature of the shingling pattern through the use of random or pseudo-random patterns of dots on each pass of the printhead instead of small repeating patterns, wherein random number are used to generate the shingling masks. However, the use of random shingling masks also produces artifacts which are related to the arrangements of the dots in the random shingling patterns. For example, the random patterns may posses both high and low frequency image content as is characteristic of a random signal. The presence of the low frequency information is undesired, since the human visual system is known to be sensitive to low frequencies. Such low frequency information present in the random shingling masks may be observed in the printed result as an objectionable grain pattern.

SUMMARY OF THE INVENTION

The invention, in one form thereof, is directed to a method of printing dots in an area on a page using a plurality of printing passes of a printhead over the area. The method includes processing continuous tone data through a halftoning mechanism to generate halftone image data; and processing the halftone image data through a plurality of error diffused shingling masks, each error diffused shingling mask of the plurality of error diffused shingling masks being used once on a particular pass of the plurality of printing passe in printing the area.

The invention, in another form thereof, is directed to a system for printing dots in an area on a page using a plurality of printing passes of a printing over the area. The system includes a print engine, a halftoning mechanism that receives and processes continuous tone data to generate halftone image data, and an image formatting mechanism communicatively coupled between the halftoning mechanism and the print engine. The image formatting mechanism is configured to receive and process the halftone image data through a plurality of error diffused shingling masks. Each error diffused shingling mask of the plurality of error diffused shingling masks is used once an a particular pass of the plurality of printing passes in printing the area with the print engine.

The invention, in another form thereof, is directed to a method of generating a set of shingling masks. The method includes generating a plurality of error diffused patterns of dots populated over a predefined area; and selecting for each pixel location in the predefined area only one pattern of the plurality of error diffused patterns of dots for populating a respective pixel location in the predefined area, wherein each pattern of the plurality of error diffused patterns of dots corresponds to a particular shingling pass of a plurality of shingling passes.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DESCRIPTION OF THE PREFERRED EMBODIMENT

Figure 1:
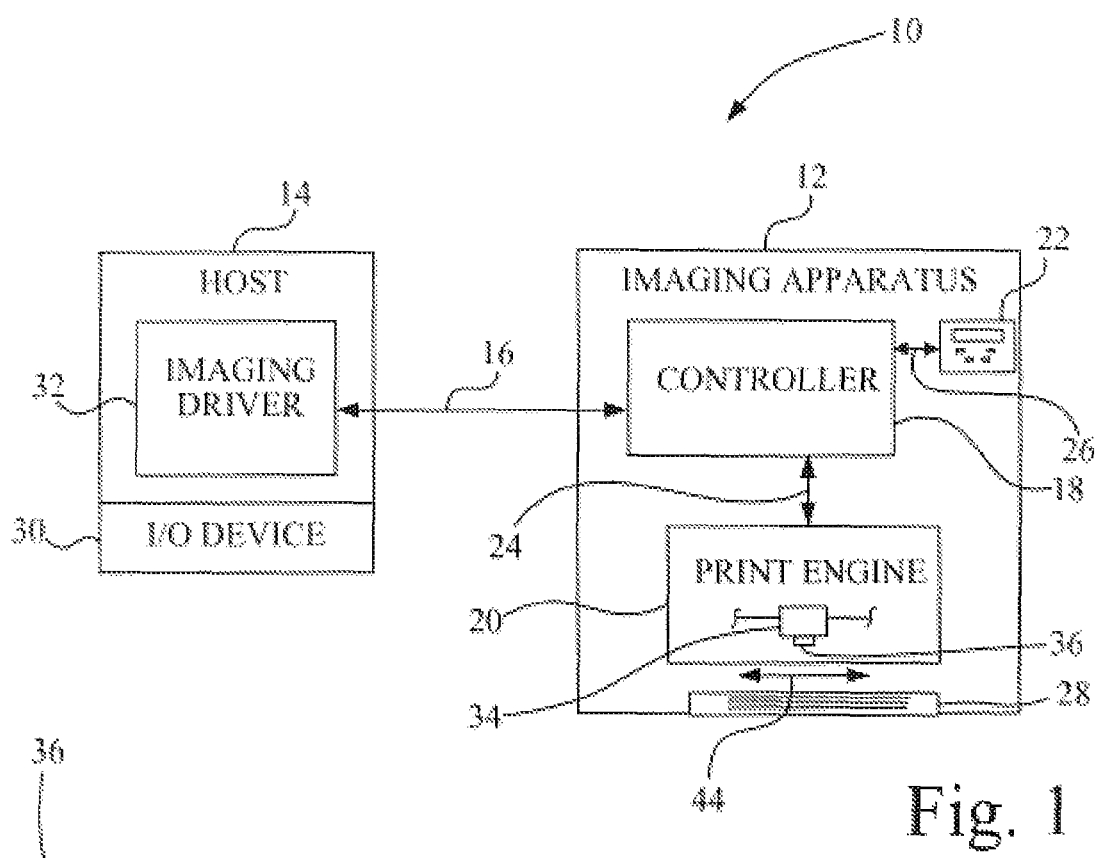
FIG. 1 is a diagrammatic representation of a system employing an embodiment of the present invention.

There is shown FIG. 1 a diagrammatic depiction of a system 10 embodying the present invention. System 10 may include an imaging apparatus 12 and a host 14, with imaging apparatus 12 communicating with host 14 via a communications link 16. Alternatively, imaging apparatus 12 may be a standalone unit that is not communicatively linked to a host, such as host 14. For example, imaging apparatus 12 may take the form of a multifunction machine that includes standalone copying and facsimile capabilities, in addition to optionally serving as a printer when attached to a host, such as host 14.

Imaging apparatus 12 may be, for example, an ink jet printer and/or copier. Imaging apparatus 12 includes a controller 18, a print engine 20 and a user interface 22.

Controller 18 includes a processor unit and associated memory, and may be formed as an Application Specific Integrated Circuit (ASIC). Controller 18 communicates with print engine 20 via a communications link 24. Controller 18 communicates with user interface 22 via a communication link 26.

In the context of the examples for imaging apparatus 12 given above, print engine 20 may be, for example, an ink jet print engine configured for forming an image on a page 28, e.g., a sheet of print media, such as a sheet of paper, transparency or fabric.

Host 14 may be, for example, a personal computer including an input/output (I/O) device 30, such as keyboard and display monitor. Host 14 further includes a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 32, e.g., printer driver software, for imaging apparatus 12. Imaging driver 32 is in communication with controller 18 of imaging apparatus 12 via communications link 16. Imaging driver 32 facilitates communication between imaging apparatus 12 and host 14, and may provide formatted print data to imaging apparatus 12, and more particularly, to print engine 20.

Alternatively, however, all or a portion of imaging driver 32 may be located in controller 18 of imaging apparatus 12. For example, where imaging apparatus 12 is a multifunction machine having standalone capabilities, controller 18 of imaging apparatus 12 may include an imaging driver configured to support a copying function, and/or a fax-print function, and may be further configured to support a printer function. In this embodiment, the imaging driver facilitates communication of formatted print data, as determined by a selected print mode, to print engine 20.

Communications link 16 may be established by a direct cable connection, wireless connection or by a network connection such as for example an Ethernet local area network (LAN). Communications links 24 and 26 may be established, for example, by using standard electrical cabling or bus structure, or by wireless connection.

Print engine 20 may include, for example, a reciprocating printhead carrier 34 that carries at least one ink jet printhead 36, and may be mechanically and electrically configured to mount, carry and facilitate multiple cartridges, such as a monochrome printhead cartridge and/or one or more color printhead cartridges, each of which includes a respective printhead 36. For example, in system using cyan, magenta, yellow and black inks, printhead carrier 34 may carry four printheads, one printhead for each of cyan, magenta, yellow and black. As a further example, a single printhead, such as printhead 36, may include multiple ink jetting arrays, with each array associated with one color of a plurality of colors of ink. In such a printhead, for example, printhead 36 may include cyan, magenta, and yellow nozzle arrays for respectively ejecting full strength cyan (C) ink, full strength magenta (M) ink and yellow (Y) ink. Further, printhead 36 may include dilute colors, such as dilute cyan (c), dilute magenta (m), etc. The term, dilute, is used for convenience to refer to a ink that does not have a luminance intensity as high as that associated with a corresponding full strength ink of substantially the same chroma, and thus, such dilute inks may be, for example, either dye based or pigment based.

Figure 2:
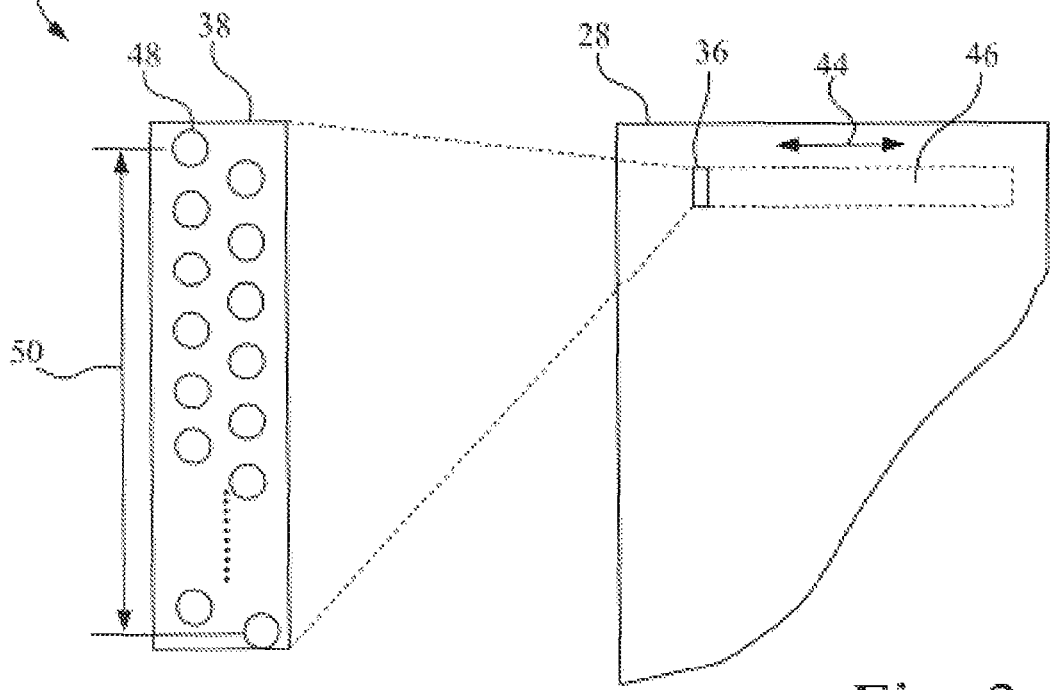
FIG. 2 is a diagrammatic representation of a printhead defining a swath on a page.

FIG. 2 illustrates an exemplary nozzle configuration of printhead 36, including a monochrome nozzle array 38 for ease of discussion. Printhead carrier 34 is controlled by controller 18 to move printhead 36 in a reciprocating manner along a bi-directional scan path 44, which will also be referred to herein as horizontal direction 44. Each left to right, or right to left movement of printhead carrier 34 along bi-directional scan path 44 over page 28 will be referred to herein as a pass. The area traced by printhead 36 over page 28 for a given pass is referred to herein as a swath, such as for example, swath 46 as shown in FIG. 2.

In the exemplary nozzle configuration for ink jet printhead 36 shown in FIG. 2, nozzle array 38 includes a plurality of ink jetting nozzles 48. As within a particular nozzle array, the nozzle size may be, but need not be, the same size. A swath height 50 of swath 46 corresponds to the distance between the uppermost and lowermost of the nozzles of printhead 36.

Those skilled in the art will recognize that the discussed above with respect to FIG. 2 regarding a monochrome nozzle array 38 may be easily applied to a color printing, e.g., where printhead 36 is a color printhead including multiple arrays representing a plurality of primary full strength colors and/or dilute colors of ink.

Figure 3:
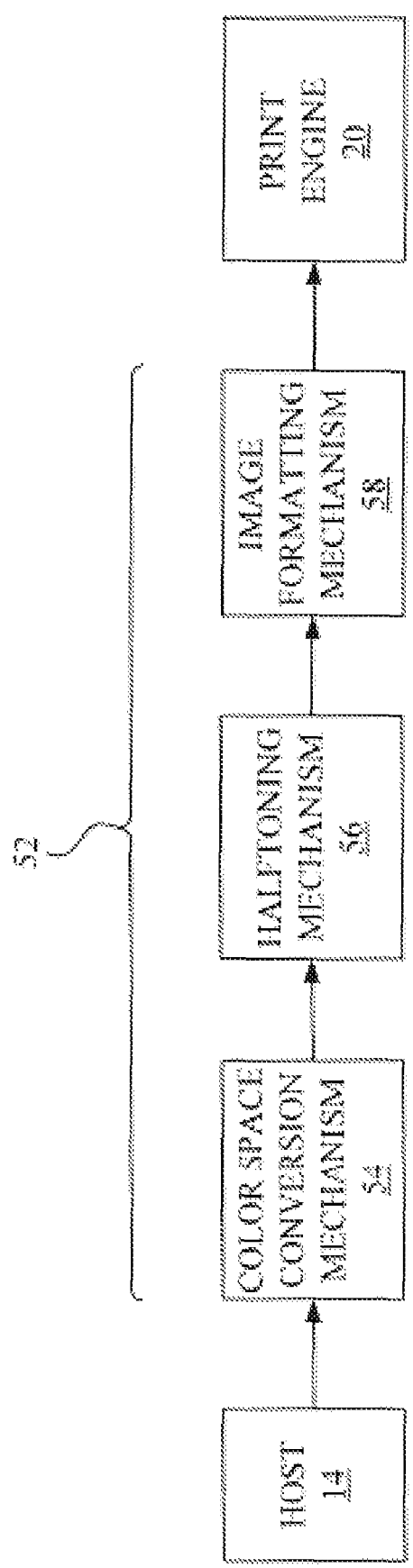
FIG. 3 is a block diagram of an embodiment of a data conversion mechanism that may be utilized in the imaging system of FIG. 1.

Referring to FIG. 3, in order for print data from host 14 to be properly printed by print engine 20, the rgb data generated by host 14 is converted into data compatible with print engine 20 and printhead 36. In the regard, an exemplary data conversion mechanism 52 is used to convert rgb data, generated for example by host 14, into data compatible with print engine 20.

Data conversion mechanism 52 may be located in imaging driver 32 of host 14, in controller 18 of imaging apparatus 12, or a portion of data conversion mechanism 52 may be located in each of imaging driver 32 and controller 18. Data conversion mechanism 52 includes a color space conversion mechanism 54, a halftoning mechanism 56, and an image formatting mechanism 58. Each of color space conversion mechanism 54, halftoning mechanism 56, and image formatting mechanism 58 may be implemented in software, firmware, hardware, or a combination thereof, and may be in the form of program instructions and associated data array and/or lookup tables.

In general, color space conversion mechanism 54 takes signal from one color space domain and converts them into signal of another color space domain for each image generating color space domain of, for example, a color display monitor that utilizes primary colors red (r), green (g) and blue (b) to a light-reflective color space domain of, for example, a color printer that utilizes colors, such as for example, cyan (C, c), magenta (M, m), yellow (Y) and black (K).

In the example of FIG. 3, rgb data, such as the output form an application executed on host 14, is supplied to color space conversion mechanism 54 to generate continuous tone data. The continuous tone data is then processed by halftoning mechanism 56 using a halftoning algorithm, such as an error diffusion halftoning algorithm, to generate halftone image data. The halftoning algorithm generates the eventual pattern of dots to be placed on a page as result of the printing process.

The halftone image data is then processed by image formatting mechanism 58, which outputs formatted image data at a desired format and output resolution for use by print engine 20. In accordance with the present invention, image formatting mechanism 58. utilizes error diffused shingling masks to decide on which pass of printing passes of the ink jet printhead over a given print area that particular dots of ink are to be deposited. In other words, a different error diffused shingling mask is used for each pass of a multi-pass printing operation to complete printing of a particular printing area on the printed page in accordance with the eventual pattern of dots generated by halftoning mechanism 56. The printing area includes a plurality of substantially horizontal printing lines, as is known in the art, and with shingling only a portion of the dot positions on a particular line are deposited on a particular printing pass.

Halftoning mechanism 56 and image formatting mechanism 58 are independent mechanisms whereby the halftone algorithm of halftoning mechanism 56 decides where the final pattern of dots resides on paper, and the shingling algorithm of image formatting mechanism 58 determines intermediate patterns of individual printing passes so as to deliver a final result in which the pattern produced by the halftone algorithm is faithfully rendered on paper after all passes have been completed. In the past, error diffusion has been applied exclusively to the halftoning. However, according to the present invention, whereas a first error diffusion may be used as a method of halftoning, a second error diffusion, operating exclusively and independently form the first error diffusion, is employed in the task of generating error diffused shingling masks which may be generated once and stored in memory, e.g., in controller 18, to be used in printing documents.

Figure 4:
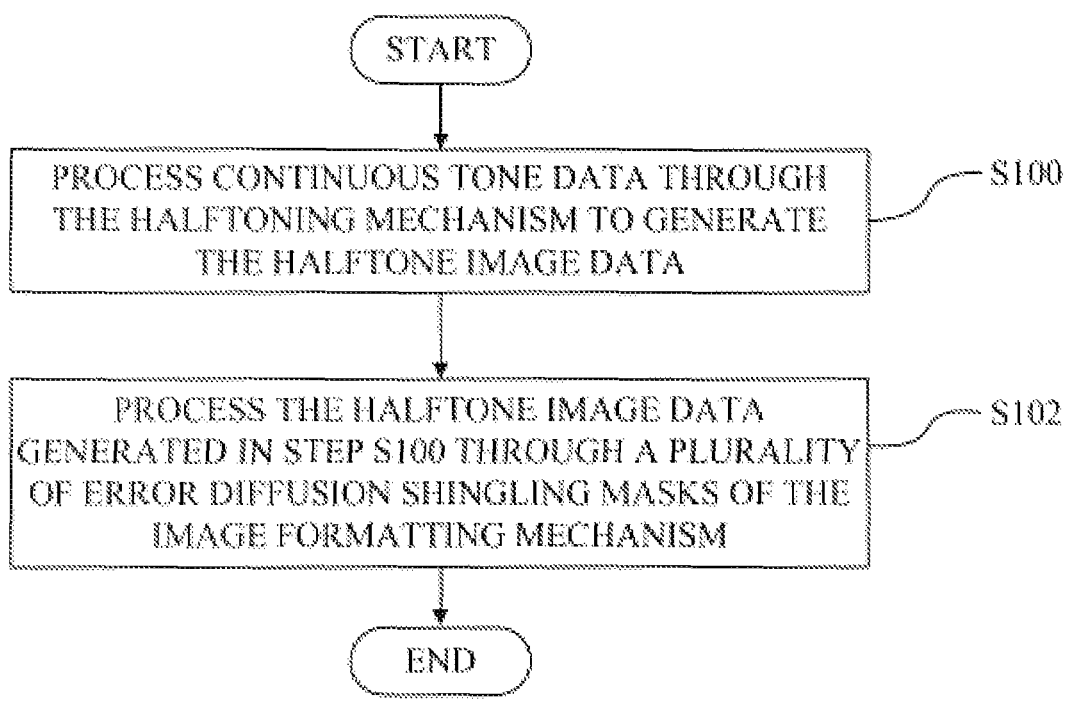
FIG. 4 is a general flow chart of a method of printing in accordance with an embodiment of the present invention.

FIG. 4 is a general flow chart of a method of printing in accordance with an embodiment of the present invention.

At step S100, continuous tone data is processed through halftoning mechanism 56 to generate halftone image data. Halftoning mechanism 56 uses, for example, an error diffusion halftone algorithm to generate the halftone data representing an eventual pattern of dots to be placed on the page as a result of a printing process.

At step S102, the halftone image data generated in step S100 is processed through a plurality of error diffused shingling masks of image formatting mechanism 58. Each error diffused shingling mask of the plurality of error diffused shingling masks is used once on a particular pass of the plurality of printing passes 1 to N in printing an area of the page. In other words, the number of error diffused shingling masks will correspond to the number of shingled printing passes N, and printhead 36 will pass over each pixel location in the area N times. For example, if N (the number of passes) equals two, then the number of error diffused shingling masks is two as well, and the number of times printhead 36 will pass over each pixel location in the area is two. As a further example, if N (the number of passes) equals four, then the number of error diffused shingling masks is four as well, and the number of times printhead 36 will pass over each pixel location in the area is four, etc.

Thus, the eventual pattern of dots to be placed on the page generated by the error diffusion halftone algorithm at step S100 is processed by the plurality of error diffused shingling masks at step S102 to determine which pass of the plurality of printing passes each dot of the eventual pattern of dots will be deposited on the page. Advantageously, each of the error diffused dot patterns generated by the plurality of error diffused shingling masks (i.e., one error diffused dot pattern per pass) lack low frequency information that contributes to perceived graininess, which is in contrast to random shingling masks that generate random dot patterns having low frequency information.

Figure 5:
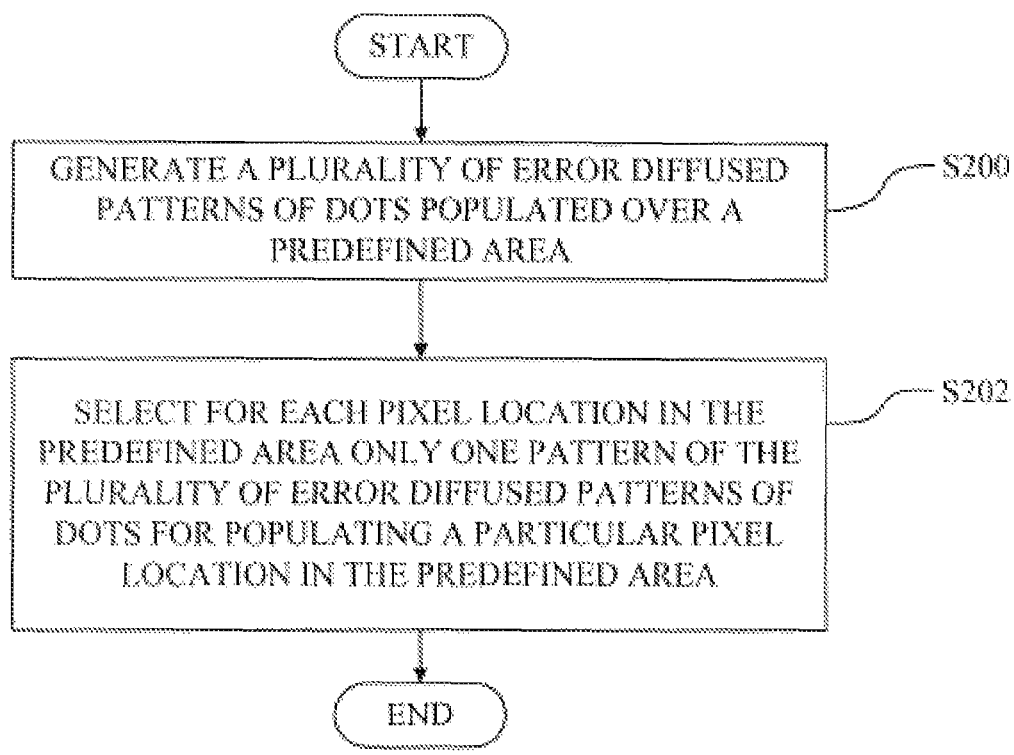
FIG. 5 is a flowchart of a method for generating error diffused shingling masks in accordance with an embodiment of the present invention.

FIG. 5 is a flowchart of a method for generating a set of N error diffused shingling masks, wherein N is the number of shingling printing passes. The process may be performed, for example, by a computer executing a set of program instructions. The generation of the set of error diffused shingling masks according to an embodiment of the present invention will be described with respect to an example in which the number of shingling passes is N=16 passes.

At step S200, a plurality of error diffused patterns of dots populated over a predefined area is generated. A plurality of error diffusion algorithms may be employed to generate the corresponding plurality of error diffused patterns of dots. The general practice of error diffusion in non-shingling applications is well documented and a description of its function is not repeated here.

In the present example, where the number of shingling passes is N=16, 16 error diffusion algorithms EDx (e.g., ED1 through ED16) operating independently of one another are used to produce 16 patterns of dots PTx (e.g., PT1 through PT16), with each pattern representing about one sixteenth of the total coverage in the given predefined area.

At step S202, the process selects for each pixel location in the predefined area only one pattern of the plurality of error diffused patterns of dots for populating a particular pixel location in the predefined area. Each pattern of the plurality of error diffused patterns of dots corresponds to a particular shingling pass of plurality of shingling passes.

Figure 6:
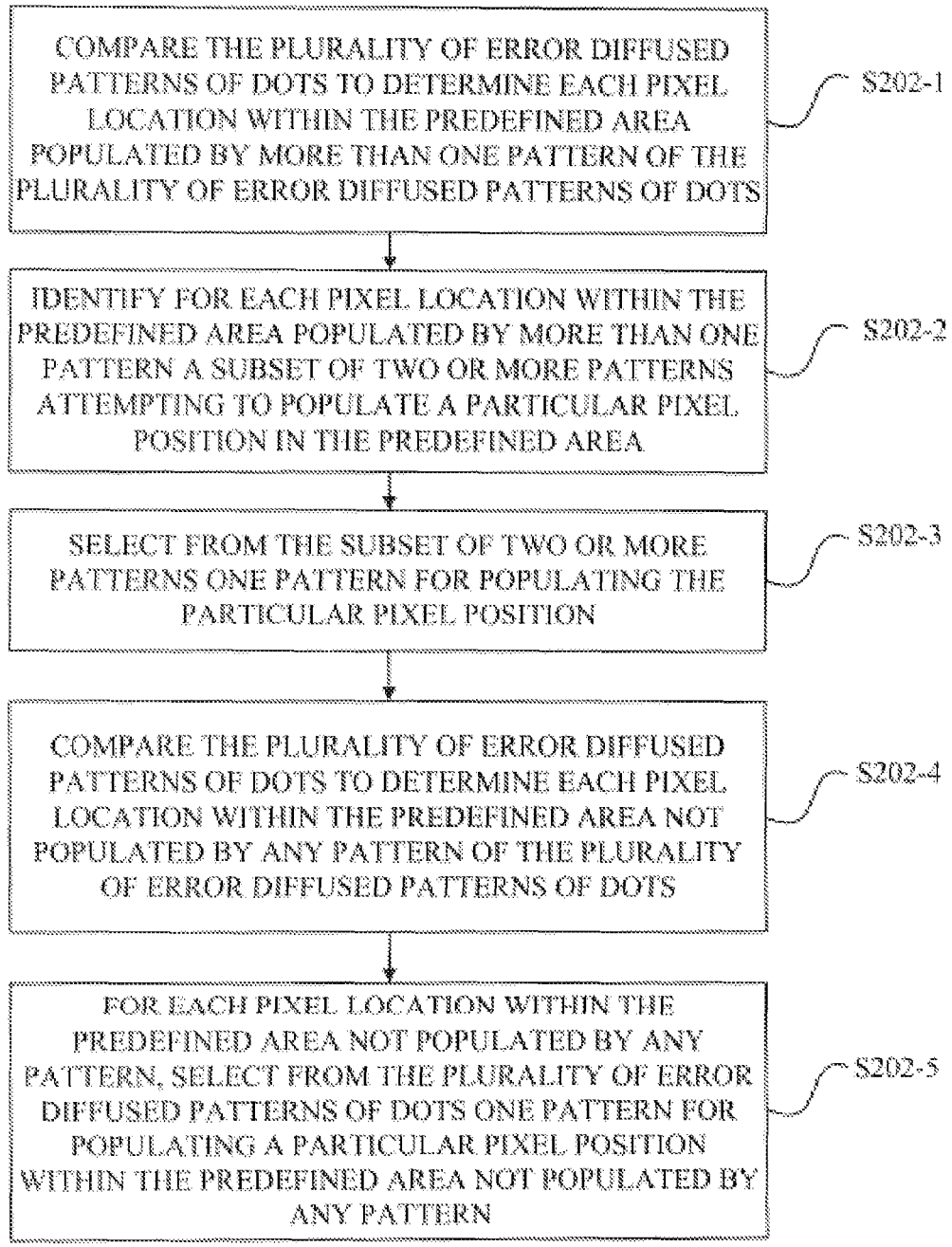
FIG. 6 is a flowchart of exemplary sub-steps that may be performed in performing the method of FIG. 5.

As shown in the flowchart of FIG. 6, step S202 may include several sub-steps in making the selection, as described below.

At sub-step S202-1, the plurality of error diffused patterns of dots are compared one to another to determine each pixel location within the predefined area populated by more than one pattern of the plurality of error diffused patterns of dots. If only one pattern populates a particular pixel location, then that pattern is selected for that particular pixel location.

At sub-step S202-2, for each pixel location within the predefined area populated by more than one pattern, a subset of two or more patterns attempting to populate a particular pixel position in the predefined area is identified.

At sub-step S202-3, the process selects form that subset of two or more patterns one pattern for populating the particular pixel position. In turn, a remainder of the subset of two or more patterns is prohibited from populating that particular pixel position. Sub-step S202-3 may be performed, for example, by determining for each pattern in the subset of two or more patterns a distance Dx between the particular pixel position in the predefined area and a closest adjacent populated pixel position in the respective pattern, and then selecting from the subset of two or more patterns a pattern that has the largest distance Dx as the one pattern for populating the particular pixel position.

At sub-step S202-4, the process compares the plurality of error diffused patterns of dots one to another to determine each pixel location within the predefined area not populated by any pattern of the plurality of error diffused patterns of dots.

At sub-step S202-5, for each pixel location within the predefined area not populated by any pattern, the process selects from the plurality of error diffused patterns of dots one patterns for populating a particular pixel position within the predefined area not populated by any pattern. Sub-step S202-5 may be performed, for example, by determining for each pattern of the plurality of error diffused patterns of dots a distance Dx between the particular pixel position in the predefined area and a closet adjacent populated pixel position in the respective pattern, and selecting from the plurality of error diffused patterns of dots pattern that has the largest distance Dx as the one pattern for populating the particular pixel position.

Those skilled in the art will recognize that the generated set of error diffused shingling masks may be applied serially during a printing operation, or alternatively, the set of error diffused shingling masks may be incorporated into an array having rows and column of pixel location corresponding in size to that of a particular page size, e.g., A4, 8-½×11, etc.

In accordance with the present invention, the use of error diffused shingling masks independent of the halftoning process successfully reduces or eliminates both the ordered artifacts produced by ordered shingling masks (e.g., checkerboard) as well as the low frequency grain that result form random shingling masks.

While this invention has been described with respect to embodiment of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of printing dots in an area on a page using of plurality of printing passes of a printhead over said area, comprising:

processing continuous tone data through a halftoning mechanism to generate halftone image data; and processing said halftone image data through a plurality of error diffused shingling masks, each error diffused shingling mask of said plurality of error diffused shingling masks being used once on particular pass of said plurality of printing passes in printing said area.

2. The method of claim 1, wherein said halftoning mechanism uses an error diffusion halftone algorithm to generate said halftone image data representing an eventual pattern of dots to be placed on said page as a result of a printing process.

3. The method of claim 2, wherein said eventual pattern of dots to be placed on said page generated by said error diffusion halftone algorithm are processed by said plurality of error diffused shingling masks to determine which pass of said plurality of printing passes each dot of said eventual pattern of dots will be deposited on said page.

4. The method of claim 1, wherein said plurality of error diffused shingling masks used in processing said halftone image data are generated by a plurality of error diffusion algorithms.

5. A system for printing dots in an area on a page using a plurality of printing passes of a printhead over said area, comprising:

a print engine;

a halftoning mechanism that receives and processes continuous tone data to generate halftone image data; and an image formatting mechanism communicatively coupled between said halftoning mechanism and said print engine, said image formatting mechanism being configured to receive and process said halftone image data through a plurality of error diffused shingling masks, each error diffused shingling mask of said plurality of error diffused shingling masks being used once on a particular pass of said plurality of printing passes in printing said area with said print engine.

6. The system of claim 5, wherein said halftone mechanism uses an error diffusion halftone algorithm to generate said halftone image data representing an eventual pattern of dots to be placed on said page as a result of a printing process.

7. The system of claim 6, wherein said eventual pattern of dots to be placed on said page generated by said error diffusion halftone algorithm is processed by said plurality of error diffused shingling masks to determine which pass of said plurality of printing passes each dot of said eventual pattern of dots will be deposited on said page.

8. The system of claim 5, wherein said plurality of error diffused shingling masks used in processing said halftone image data are generated using a plurality of an error diffusion algorithms.

9. A method of generating a set of shingling masks, comprising:

generating a plurality of error diffused patterns of dots populated over a predefined area; and selecting for each pixel location in said predefined area only one pattern of said plurality of error diffused patterns of dots for populating a respective pixel location in said predefined area, wherein each pattern of said plurality of error diffused patterns of dots corresponds to a particular shingling pass of a plurality of shingling passes.

10. The method of claim 9, wherein the act of selecting includes:

comparing said plurality of error diffused patterns of dots to determine each pixel location within said predefined area populated by more than one pattern of said plurality of error diffused patterns of dots; and for each pixel location within said predefined area populated by more than one pattern:
identifying a subset of two or more patterns attempting to populate a particular pixel position said predefined area; and
selecting from said subset of two or more patterns one pattern for populating said particular pixel position.

11. The method of claim 10, wherein the act of selecting from said subset is performed by:
determining for each pattern in said subset of two or more patterns a distance Dx between said particular pixel position in said predefined area and a closest adjacent populated pixel position; and
selecting from said subset of two or more patterns a pattern that has the largest distance Dx as said pattern for populating said particular pixel position.

12. The method of claim 9, wherein the act of selecting includes:
comparing said plurality of error diffused patterns of dots to determine each pixel location within said predefined area not populated by any pattern of said plurality of error diffused patterns of dots; and
for each pixel location within said predefined area not populated by any pattern, selecting from said plurality of error diffused pattern of dots one pattern for populating a particular pixel position within said predefined area not populated by any pattern.

13. The method of claim 12, wherein the act of selecting from said plurality of error diffused patterns of dots one pattern for populating said particular pixel position is performed by:
determining for each pattern of said plurality of error diffused patterns of dots a distance Dx between said particular pixel position in said predefined area and a closest adjacent populated pixel position, and
selecting from said plurality of error diffused patterns of dots a pattern that has the largest distance Dx as said one pattern for populating said particular pixel position.

* * * * *